(No Model.)
E. CHAMBERLAIN.
HORSE BLANKET.
No. 484,996. Patented Oct. 25, 1892.
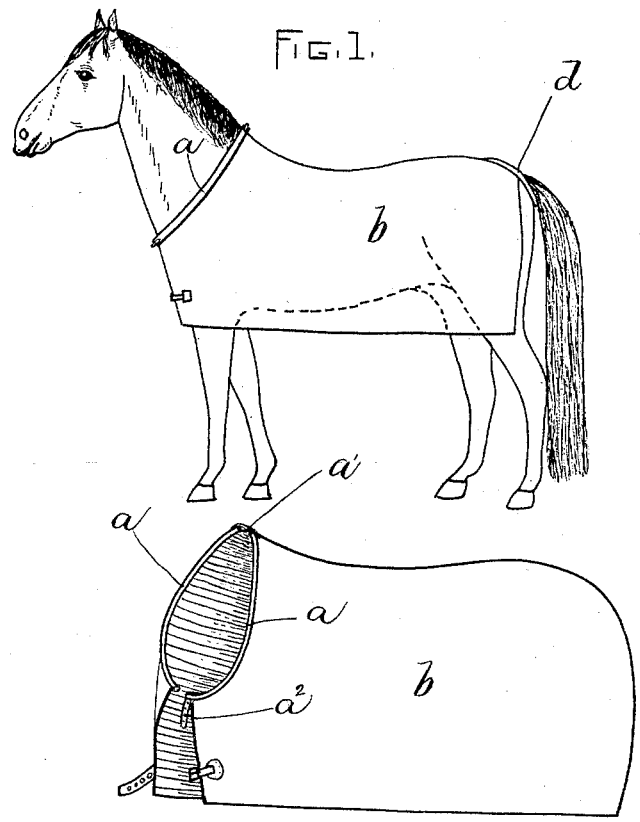

UNITED STATES PATENT OFFICE.

EPHRAIM CHAMBERLAIN, OF MEDFIELD, MASSACHUSETTS.

HORSE-BLANKET.

SPECIFICATION forming part of Letters Patent No. 484,996, dated October 25, 1892.

Application filed May 9, 1890. Serial No. 351,143. (No model.)

*To all whom it may concern:*

Be it known that I, EPHRAIM CHAMBERLAIN, of Medfield, in the county of Norfolk and State of Massachusetts, have invented a new and useful Improvement in Horse-Blankets, of which the following, taken in connection with the accompanying drawings, is a specification.

This invention has for its object to provide means for securing horse-blankets to horses in such a manner as to prevent the sidewise slipping of the blanket and obviate the use of a surcingle.

The invention consists in a neck-yoke attached to the neck end of a horse-blanket and composed of two rigid parts or side pieces, each of which is formed to approximately fit one side of the animal's neck, said pieces being flexibly connected at their upper ends, so that they constitute a yoke adapted to be opened and closed, said yoke when closed encircling the animal's neck and being adapted by the rigidity of its side pieces to prevent any side movement of the blanket upon the horse, as I will now proceed to describe.

Of the accompanying drawings, forming a part of this specification, Figure 1 represents a side view of a horse having a blanket provided with my improvements. Fig. 2 represents a perspective view of the blanket removed.

The same letters of reference indicate the same parts in both the figures.

In carrying out my invention I provide a neck-yoke the general construction of which resembles that of a pair of hames used in ordinary harness, said yoke being composed of two rigid side pieces $a\ a$, which are curved to approximately fit the animal's neck and flexibly connected at their upper ends by a strap $a'$ or other suitable flexible connection corresponding to the usual strap that connects the upper ends of the hame-pieces. The lower ends of the pieces $a\ a$ may be detachably connected by a strap $a^2$, such as is used to detachably connect the lower ends of hame-pieces. The resemblance between the neck-yoke and a pair of hames ends here, however, there being no attachments on the side pieces $a\ a$ to connect with the traces, as in hames used in harness. I have compared the neck-yoke with a pair of hames simply to give an idea of the general shape and construction of the yoke.

$b$ represents a horse-blanket of any suitable form, the neck end of which is attached to the side pieces $a\ a$ of my improved neck-yoke. The method of attaching the blanket to the yoke may be variously modified and the fabric of the blanket may be riveted to the side pieces $a\ a$, or may be formed into a wide hem of sufficient size to receive said side pieces, so that the blank will cover the latter, the object being to establish a firm connection between the side pieces $a\ a$ of the yoke and that part of the blanket that encircles the neck of the horse, so that when the neck-yoke is secured to the animal's neck the blanket will be firmly held in place by its connection with the side pieces of the yoke, and will thus be prevented from slipping sidewise upon the animal's body.

It will be seen that the rigidity of the side pieces $a\ a$ and the curved form which causes them to fit or approximately fit the side of the animal's neck enables the yoke to maintain a fixed position on the animal's neck, thus holding the blanket secured without crowding or unduly compressing the animal's neck, and thus causing discomfort, the rigid side pieces simply resting lightly upon the animal's neck and conforming to the shape thereof.

I am aware that a horse-blanket has been provided with a continuous elastic band surrounding the neck-opening and adapted to contract upon the horse's neck; but such band would not prevent the blanket from working sidewise upon the animal's neck and body, because it has no rigidity. I am also aware that a rain-cover has been devised adapted to be detachably secured to the hames of a harness; but such an article obviously does not involve my invention.

The neck-yoke, composed of the rigid side pieces $a\ a$, adapted for attachment to a horse-blanket, may be made and sold as an article of manufacture to be applied to horse-blankets of ordinary construction.

The rear end of the blanket is provided with a crupper $d$.

I claim—

A horse-blanket having a neck-yoke formed in two separate rigid parts permanently connected with said blanket at the neck end thereof, the said blanket and neck-yoke having a breast-opening and means for closing said opening, and a crupper connected to the rear end of the blanket.

In testimony whereof I have signed my name to this specification, in the presence of two subscribing witnesses, on this 2d day of May, A. D. 1890.

EPHRAIM CHAMBERLAIN.

Witnesses:
R. E. GETCHELL,
EDWARD KINGSBURY.